(No Model.)　　　　　M. E. THOMPSON.　　　5 Sheets—Sheet 1.
DYNAMO ELECTRIC MACHINE.

No. 591,024.　　　　　　　　Patented Oct. 5, 1897.

Witnesses:
E. R. Shipley.
M. S. Belden.

Milton E. Thompson, Inventor
by James W. See, Attorney

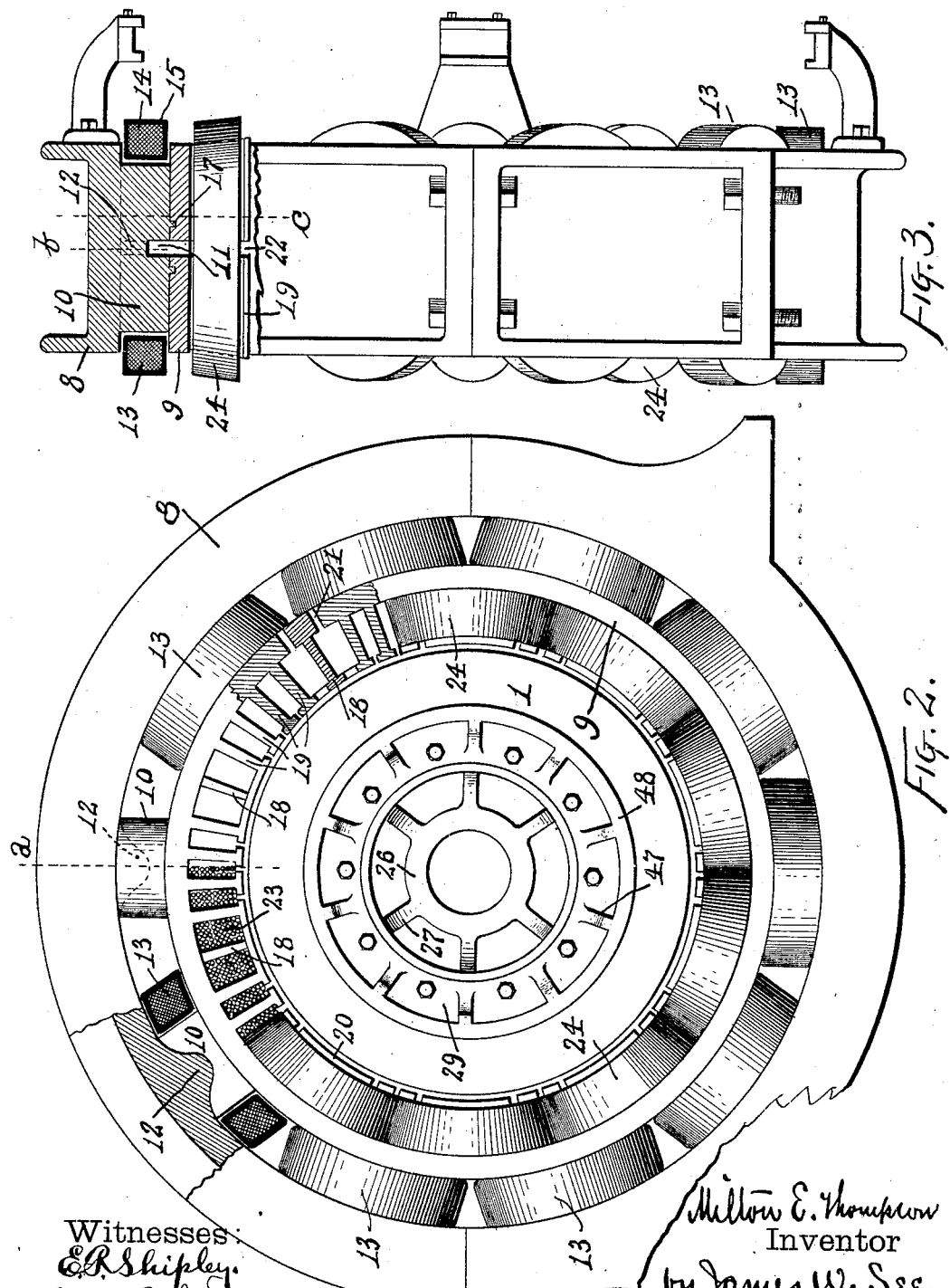

(No Model.)
M. E. THOMPSON.
DYNAMO ELECTRIC MACHINE.
No. 591,024. Patented Oct. 5, 1897.
5 Sheets—Sheet 3.
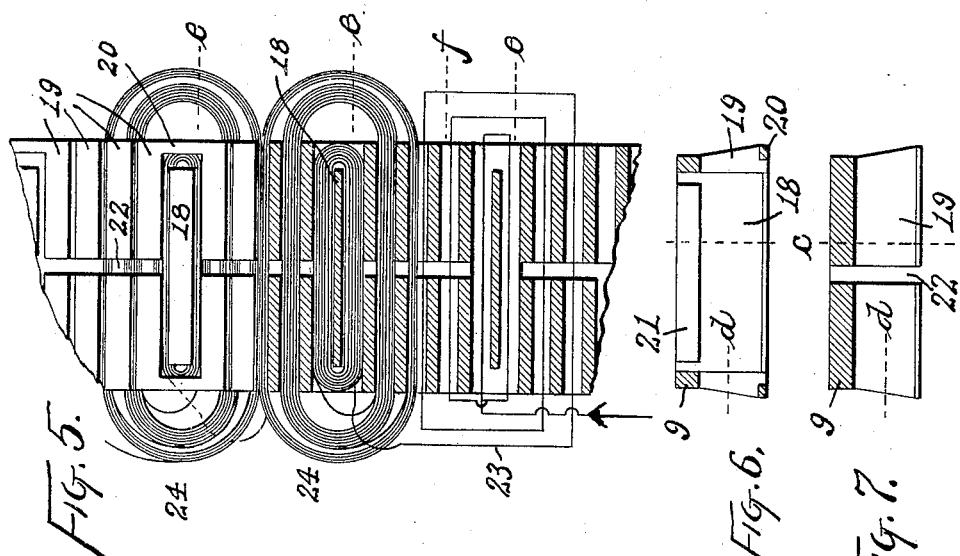
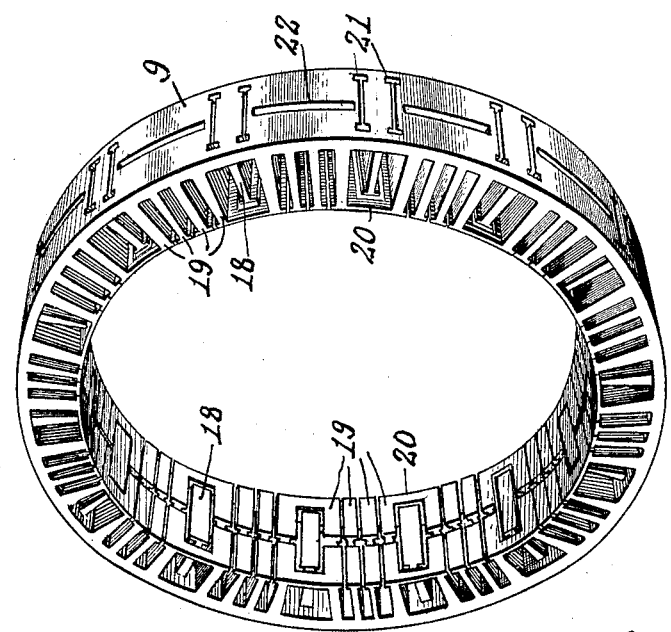
Witnesses:
E. R. Shipley.
M. S. Belden.
Milton E. Thompson
Inventor
by James W. See
Attorney (No Model.) 5 Sheets—Sheet 4.

M. E. THOMPSON.
DYNAMO ELECTRIC MACHINE.

No. 591,024. Patented Oct. 5, 1897.

Witnesses:
E. R. Shipley.
M. S. Belden.

Milton E. Thompson
Inventor
by James W. See
Attorney (No Model.) 5 Sheets—Sheet 5.
M. E. THOMPSON.
DYNAMO ELECTRIC MACHINE.
No. 591,024. Patented Oct. 5, 1897.
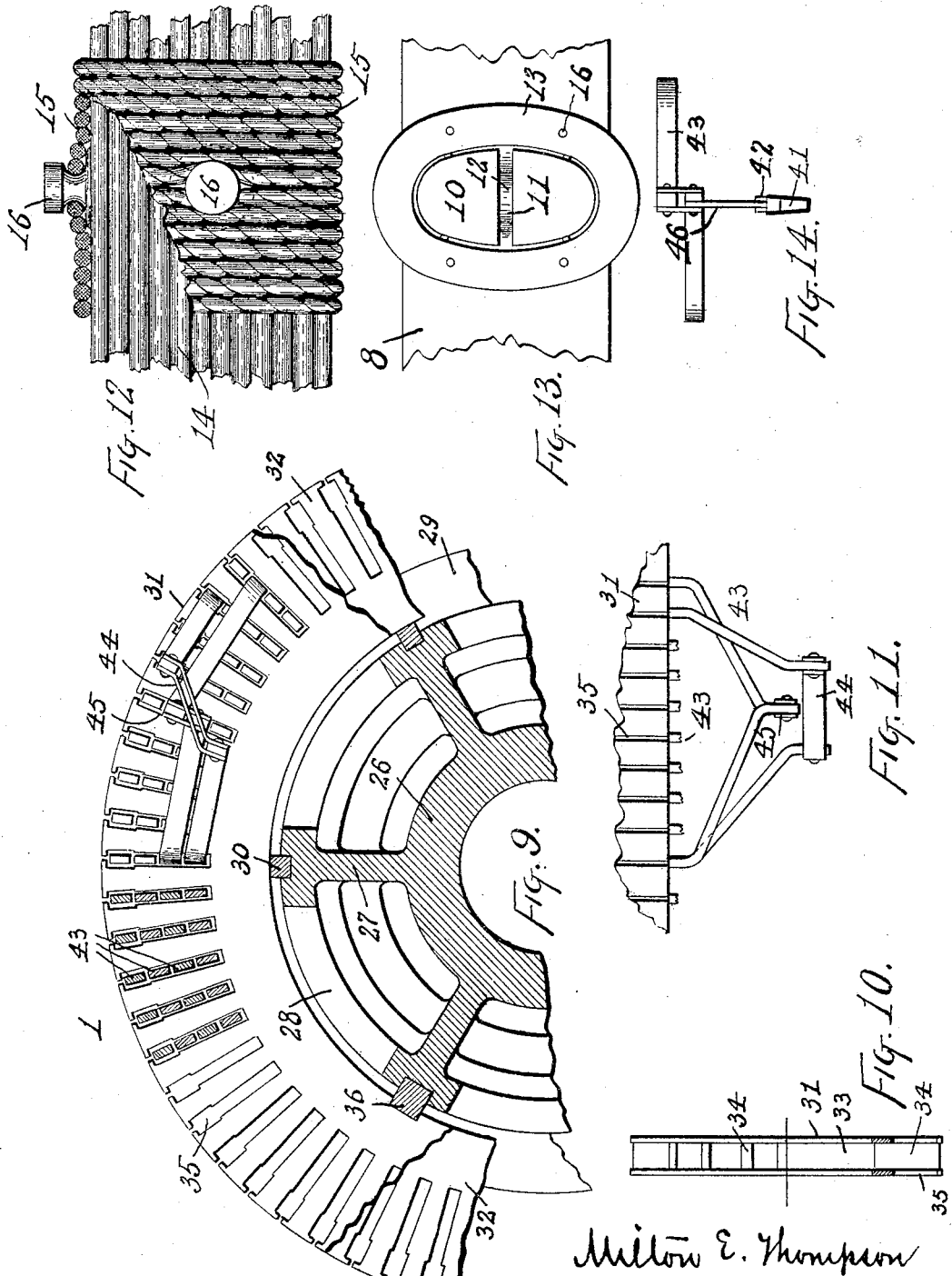
Witnesses:
E. R. Shipley
M. S. Belden
Milton E. Thompson
Inventor
by James W. See
Attorney

UNITED STATES PATENT OFFICE.

MILTON E. THOMPSON, OF RIDGWAY, PENNSYLVANIA, ASSIGNOR OF ONE-HALF TO CHARLES L. CORNELL, OF HAMILTON, OHIO.

DYNAMO-ELECTRIC MACHINE.

SPECIFICATION forming part of Letters Patent No. 591,024, dated October 5, 1897.

Application filed April 12, 1897. Serial No. 631,764. (No model.)

*To all whom it may concern:*

Be it known that I, MILTON E. THOMPSON, of Ridgway, Elk county, Pennsylvania, have invented certain new and useful Improvements in Dynamo-Electric Machines, of which the following is a specification.

This invention pertains to improvements in dynamo-electric machines or electric generators and motors, and my improvements will be readily understood from the following description, taken in connection with the accompanying drawings, in which—

Figure 1:
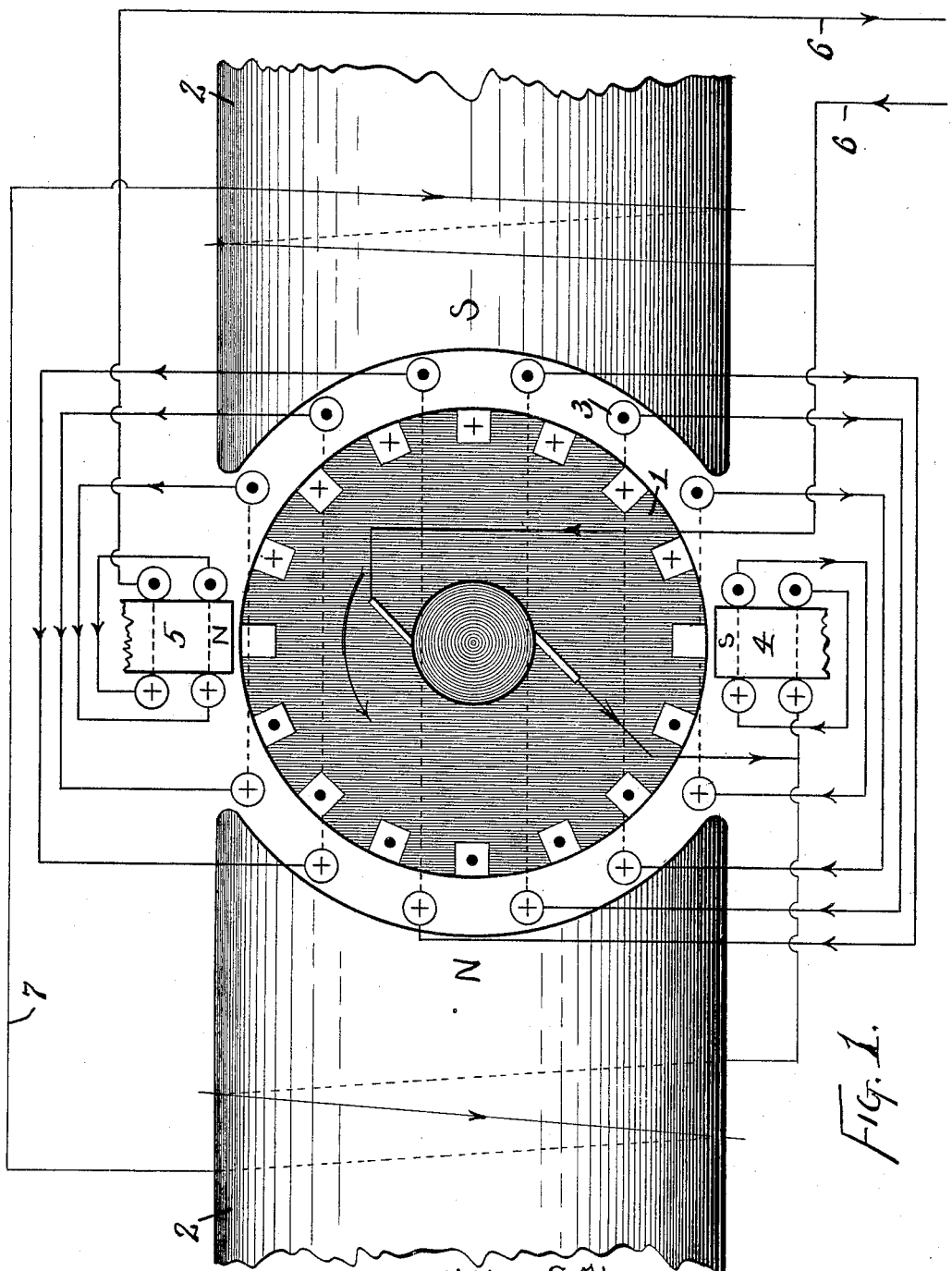
Figure 8:
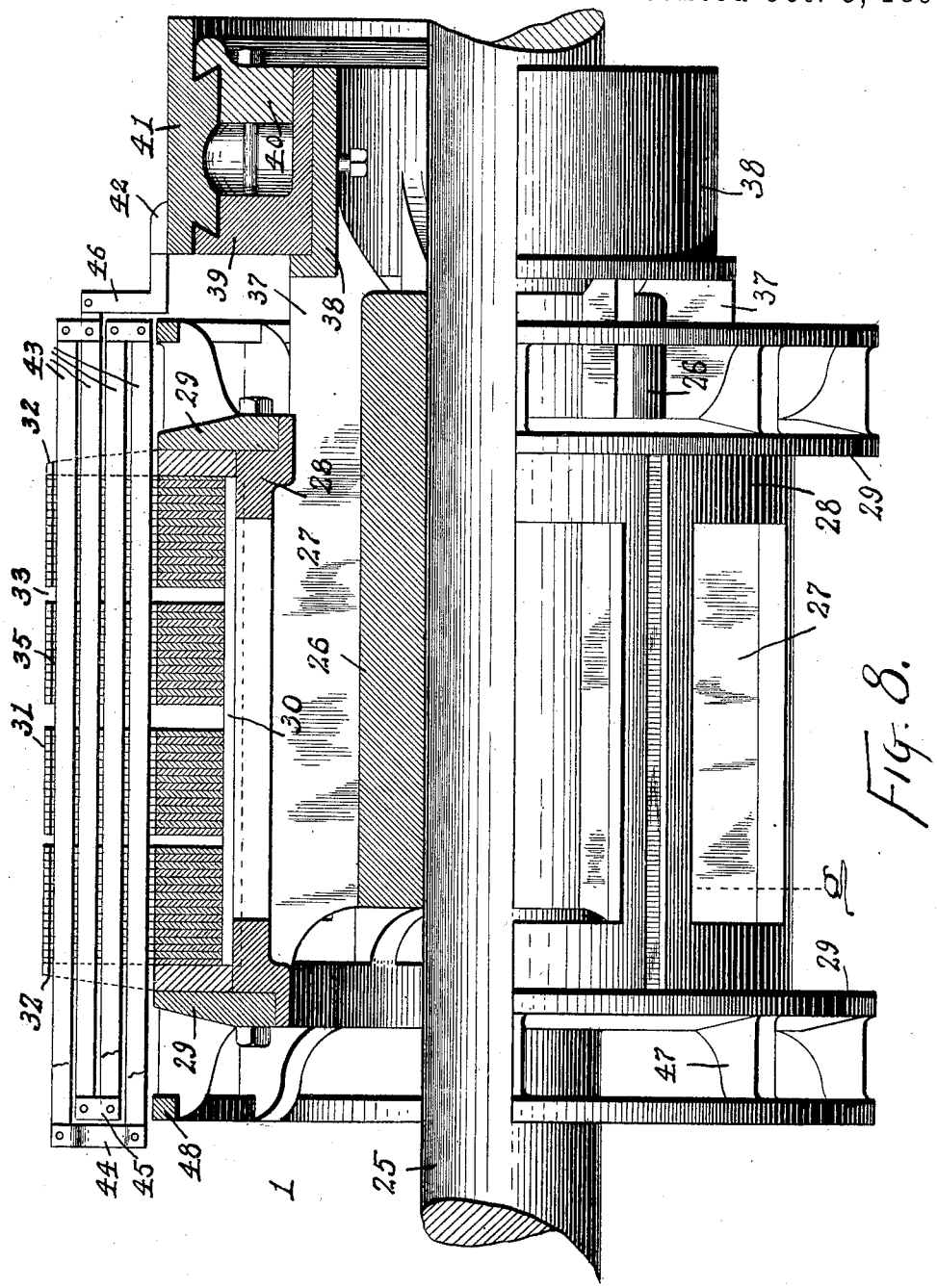

Figure 1 is an elemental diagram illustrating principles of construction involved in my improved machine as exemplified in a drum-armature machine with interior armature; Fig. 2, an end view of the field-frame, bushing-ring, and armature of a multipolar drum-armature machine exemplifying my improvements, portions appearing in vertical section in the planes of lines *b* and *c* of Fig. 3; Fig. 3, a side view of the same with the armature omitted, parts appearing in vertical section in the plane *a* of Fig. 2; Fig. 4, a perspective view of the bushing-ring without its windings; Fig. 5, a plan of the interior wall of a portion of the bushing-ring, portions of this plan appearing in horizontal section in the plane of line *c* of Figs. 6 and 7, the lower portion of this view illustrating the winding diagrammatically; Fig. 6, a radial section of the bushing-ring in the plane of line *e* of Fig. 5; Fig. 7, a similar section of the bushing-ring in the plane of line *f* of Fig. 5; Fig. 8, a side elevation of the armature-spider, shown half in diametrical section, in conjunction with its disks and bar-windings; Fig. 9, an end view of a portion of the armature, parts appearing in vertical section in the plane of line *g* of Fig. 8; Fig. 10, an edge elevation of a pair of armature-disks with their separating-blocks, the lower portion of this view presenting a section in the plane of line *a* of Fig. 2; Fig. 11, a plan of a portion of the armature projected from Fig. 9 and illustrating the system of connections between the bars forming the armature-winding; Fig. 12, an elevation of a portion of one of the field-coils with its cording, the latter being partially broken away to exhibit one of the insulating-studs; Fig. 13, an inside view of a portion of the field-frame, showing one of the pole-necks and its field-coil; and Fig. 14, an end view of a commutator-bar in connection with two of the winding-bars of the armature.

Before taking up details of the exemplifying construction I will explain the principle upon which the construction is mainly based, employing Fig. 1 for this purpose. The other figures of the drawings illustrate my invention in connection with a machine of multipolar type, but in explaining the principles involved it has been thought best for the sake of simplicity and clearness to consider a machine of the bipolar type, as illustrated in Fig. 1. In this diagram, Fig. 1, let it be understood that the dotted lines indicate conductors in the distance, that conductors viewed endwise have their direction of current indicated by a cross (representing the heel of the arrow) if the current goes from the observer and by a dot (representing the point of the arrow) if the current comes toward the observer. In Fig. 1 the armature is elementally represented as being provided with sixteen longitudinal conductors, which are to be assumed as being connected up as usual.

Referring to Fig. 1 of the drawings, 1 indicates the armature, its usual winding being represented by the sixteen longitudinal conductors with the currents flowing through them in the direction indicated by the signs, (crosses and dots,) the uppermost and lowermost conductors representing the conductors short-circuited by the brushes, the arrow on the armature indicating its direction of motion and the entire diagram treating the machine as a generator; 2, the field-poles, having the polarity indicated by N and S; 3, a circumferential series of fixed longitudinal conductors carrying currents in the directions indicated by the signs, these conductors being distributed symmetrically around the armature and occupying a position radially exterior to the armature and radially interior to the field-poles; 4, a pole of S sign presenting itself near the periphery of the armature and angularly midway between the two field-poles and in advance of the field-pole having opposite sign; 5, a similar pole of N sign disposed similarly in advance of the field-pole of opposite sign; 6, the mains which lead to the work part of circuit; 7, the shunt-circuit for the field-poles 2. It will be observed that the field is in shunt, that the main circuit includes the armature and the annular series of conductors 3, that those conductors of the armature which have currents flowing in a given direction move in the field of such of conductors of the series 3 as have currents moving in them in the opposite direction, that current strength in the conductors of series 3 will vary with that of the armature-coils, that the short-circuited armature-conductors move in the fields of poles 4 and 5, and that the strength of poles 4 and 5 varies with the armature-current, since they are energized by the series of conductors 3.

As the armature-conductors move in the magnetic field produced by series of conductors 3 bearing magnetically-opposing currents of equal strength, it is obvious that armature reaction upon the field is completely neutralized and compensated for. An armature-coil upon being short-circuited by the brushes is within and its current is reversed while it is within the fields of poles 4 and 5, which fields vary in strength with the armature-current, the current in the short-circuited coils being thus reversed and built up in strength before the coil again passes into the armature-circuit. Under this system there is no necessity for altering the position of the diameter of commutation, and there is a total avoidance of sparking.

In practice I call the poles 4 and 5 "commutation-lugs." I arrange the conductors of the series 3 as the longitudinal elements of coils. I mount the commutation-lugs and the coils forming the conductors 3 in a bushing-ring fitting within the field-poles and surrounding the armature. I use less air-gap than has been before practicable, having considered it only from a mechanical standpoint, being able to ignore it electrically. I provide the armature with conductors of great radial depth of winding, being able to deal with a depth of copper heretofore impracticable, and I produce a machine having about half the size of machines of similar capacity as constructed on other approved systems.

The diagram shown in Fig. 1 relates to a generator. For a motor the direction of current is reversed for the same direction of armature rotation, and for mechanical convenience I arrange that the bushing-ring may be reversed, face for face, in the field-frame. Any of the usual systems of circuit for armature-windings may be employed, and I illustrate a system of bar-winding having peculiar connections of a character readily lending itself to most any given system of armature-circuits.

Referring now to Figs. 2 and 3, 8 indicates the circular field-frame of a multipolar machine; 9, the bushing-ring disposed concentrically within the field-poles and around the armature and carrying the commutation-lugs and the compensating-conductors, which bushing-ring will be fully described later; 10, (see also Fig. 13,) field-poles projecting inwardly from the field-frame and bored to fit the exterior of the bushing-ring; 11, transverse slots in the field-poles, extending from the inner wall of the field-frame 8 to the inner faces of the poles and forming an air-passage across the poles; 12, projections from the roots of these slots, serving to divide the air-currents entering the faces of the poles and to direct them outwardly at each side of the poles against the wall of field-frame 8; 13, the field-coils, which coils are wound upon a proper former and then wrapped with cord and put upon the field-poles, the opening in the coil being somewhat larger than its field-pole, and the coil having a depth less than the distance between bushing-ring 9 and the wall of field-frame 8, so that air-spaces are left between the coils and the parts supporting them; 14, Fig. 12, the usual insulated wire of which the field-coils 13 are wound; 15, the cord-wrapping applied to the field-coils; 16, studs projecting from the field-coils and held in place by the cord-wrapping thereof, the wrapping coming over the feet of the studs and the heads of the studs projecting such distance as to properly engage the surfaces of field-frames, field-poles, and bushing-ring, which support the coils, these studs being of insulating material, as vulcanized fiber, and disposed over the faces and bore of the field-coils in such frequency and position as to secure proper support for the coils, which are thus held away from the metal of the machine, securing insulation and circulating-air spaces, and 17 interlocking circumferential ribs and grooves on the faces of field-poles 10 and on the periphery of bushing-ring 9, these ribs and grooves being symmetrically disposed, so that bushing-ring 9 may be reversed or turned face for face within the pole-frame.

The bushing-ring 9 will now be described, reference being had to Figs. 2, 3, 4, 5, 6, and 7, it being understood that in Fig. 2 the coils of the bushing-ring are generally shown, but in the upper part of the figure one coil is shown in section, the next coil is omitted, leaving the bushing-ring empty, and in the position of the next coil the coil is omitted and its supports shown in section.

Referring to Fig. 4, 18 indicates the commutation-lugs, projecting inwardly from the tire of the bushing-ring 9, these lugs having the form of flat plates having feet at their inner ends, which feet come close to but do not touch the armature, the lugs being of less width than the tire of the bushing-ring, there being as many commutation-lugs as there are field-poles, the commutation-lugs occupying angular positions midway between the field-poles, as seen in Fig. 2; 19, a pair of lugs at each side of each commutation-lug and similarly projecting inwardly from the tire of the bushing-ring, the lugs 19 being similar in construction to the commutation-lugs 18, except that the lugs 19 have greater length than the commutation-lugs; 20, bridges extending across each end of each commutation-lug 18 without touching the commutation-lug and forming a strengthening-tie between the lugs 19 at each side of the commutation-lug; 21, slots through the tire of the bushing-ring at each side of each commutation-lug and extending almost across the tire, and 22 slots through the tire of the bushing-ring and extending circumferentially from near one pair of slots 21 to near succeeding pair, these slots being extended inwardly entirely through lugs 19. The bushing-ring thus presents the aspect of a hoop having plate-like lugs projecting inwardly from it, some of which lugs form the commutation-lugs, the others forming supports for the compensating-coils. The inner face of the bushing-ring is formed by the feet at the inner extremities of the lugs, the surface being interrupted only by the slots between the feet and by the slots 22. Between the lugs there are thus formed pockets in which the various coils may be wound. The various slots interrupt the magnetic conductivity of the metal of the bushing-ring, and the slots 22 form air-passages entirely through the bushing-ring and permitting air, as propelled by the armature, to pass through the bushing-ring and between the field-coils, and also inside the field-coils through the slots 11 in the field-poles, the latter slots registering with slots 22. The bushing-ring after being properly wound forms a structure complete within itself and held reversibly by the field-poles, within which it fits. The windings of the bushing-ring will now be described with reference to Fig. 5, in which is seen one complete coil at a complete portion of the bushing-ring, a complete coil at a portion of the bushing-ring shown in section through the set of lugs, and a similar set of lugs shown in section with the coils of the winding shown diagrammatically.

Referring to Fig. 5, 23 indicates a winding which when traced according to its arrow is found to first pass around the commutation-lug in a certain direction of winding, then pass around a pair of extra lugs which straddle the commutation-lug, then pass around the outer pair of lugs in the set, these windings all being in the same direction, then going on to and around the next commutation-lug, and then around the lugs which straddle this second commutation-lug, and then around the outer lugs of the set, thus completing the second set of windings, which are in a reverse direction to the first set, the winding then going to the third commutation-lug, and 24 indicates the coil formed by each complete set of windings. Each coil 24 therefore represents a winding on its commutation-lug and also windings exterior thereto and supported by the lugs 19, the windings of the alternate sets or coils being in one direction and the windings of the intermediate sets or coils being in the other direction, the coils being connected up in series. The windings of coil 24 correspond in their longitudinal elements with the series of conductors 3, (seen in the diagram of Fig. 1,) the curves at the ends of these windings being merely the connections to get the circuits through the longitudinal portions of the windings, and by tracing the current in Fig. 5 in accordance with its indicating-arrow it will be found that the direction of current is such as to correspond with the diagram of Fig. 1—that is to say, all the currents flowing across the bushing-ring between a given pair of commutation-lugs will be found flowing in one direction and in the succeeding space between two commutation-lugs the current will be found flowing in the opposite direction. In the diagram of Fig. 1 notice that in the series of conductors 3 all those at the right hand between poles 4 and 5 bear currents in one direction and those at the left hand bear currents in the reverse direction. The coils of the bushing-ring are in series with each other and in series with the armature. The commutation-lugs 18 are each involved within a coil and are energized by the entire coil and given a polarity due to the direction of winding. The other lugs 19 are practically unaffected by the currents in the windings, due to the fact that these lugs are between conductors bearing currents flowing in the same direction. Referring to Fig. 2, it will be observed that a commutation-lug 18 comes midway between each pair of field-poles 10, and the winding is such that the polarity of a given commutation-lug is that of the leading field-pole. This is the condition when the machine is used as a generator. When the machine is to be used as a motor, the currents in both armature and compensating coils are reversed, the direction of rotation remaining the same. Commutation-lugs 18 are thus caused to have the polarity of the trailing field-poles.

Only the armature remains to be described. Referring to Figs. 8, 9, 10, 11, and 14, 25 indicates the armature-shaft; 26, the armature-hub; 27, arms projecting radially from the hub and extending lengthwise of the hub; 28, a ring at each end of these arms, the periphery of these rings and of the arms being turned cylindrically to form the skeleton barrel of the armature; 29, annular clamp-flanges bolted against the outer faces of rings 28 and forming clamps to hold the armature-disks; 30, bars of non-magnetic metal, as brass, disposed in longitudinal grooves in the peripheries of arms 27, these bars lying about half their depths in the grooves, the other half of their depths thus projecting outwardly from the periphery of the armature-barrel; 31, the armature-disks, being thin iron plates having a bore fitting upon brass ribs 30, the periphery of the disks forming the cylindrical outer surface of the armature; 32, annular clamp-flanges of non-magnetic metal, as brass, fitting upon the barrel of the armature between clamp-flanges 29 and the ends of the series of armature-disks, these flanges 32 projecting outwardly to the full diameter of the disks; 33, spaces provided at intervals along the series of armature-disks; 34, radial bars disposed in the spaces 33 between the disks immediately at each side of the spaces and riveted to those disks, as seen in Fig. 10, the spaces 33 therefore being formed by a pair of the disks secured to the separating-bars; 35, radial slots in the disks and therefore forming slots extending lengthwise of the entire series of disks, these slots being intended to receive the bars forming the armature-winding, the slots having a width suited to this purpose and extending from near the periphery of the disks inwardly a sufficient distance to receive the desired number of bars, the slots having a very narrow outward prolongation through the periphery of the disks, and that portion of the slots just within this narrow portion having a width greater than the remaining inner portion of the slots, so that an armature-bar may be freely inserted endwise in the armature and then forced down into the inner portion of the slots; 36, Fig. 9, a special one of ribs 30, having superior outward projection, so as to engage in a notch formed in each of the armature-disks, this special rib 36 therefore forming a key to bring the slots of the disk into registry and to prevent the angular displacement of the disks upon the armature-barrel; 37, outward prolongations of arms 27 at the commutator end of the armature; 38, a cylindrically-hollow nose carried concentrically by the outer ends of the arms 37; 39, the commutator-hub fitting upon nose 38 and held thereon by set-screws screwing outwardly through nose 38; 40, the commutator-clamp, being a ring fitting upon commutator-hub 39 and drawn thereon by bolts, the peripheries of the commutator-hub and commutator-clamp having the form of dovetail lips, forming between them a dovetailed recess engaged by the commutator-bars; 41, the commutator-bars, disposed as usual in circumferential series and insulated from each other and having inward dovetail projections engaged by the lips of the commutator hub and clamp; 42, a lug projecting outwardly from the inner end of each commutator-bar, this lug being slitted lengthwise and radially to receive a thin metallic connecting-strip; 43, the armature-bars, disposed in the slots of the armature-disks and extending a considerable distance outwardly at each end of the series of disks, these bars being provided with the usual insulation, (not shown,) and the bars at their ends being bent sidewise, as seen in Figs. 9, 11, and 14, so that one end of any given bar may be brought into the neighborhood of the similarly-bent corresponding end of any other given bar of the armature; 44, coupling-bars riveted and soldered to the ends of any two armature-bars which are to be connected, these coupling-bars being also bent, so that the cross connection between two given armature-bars is formed through bent portions of the armature-bars and the bent coupling-bars; 45, similar coupling-bars employed in connecting other pairs of armature-bars, the armature-bars to be connected by the couplings 45 having less length than those connected by couplings 44, the cross connections between armature-bars being thus represented by short bars connected by couplings 45 and long bars connected by couplings 44, couplings 44 coming outwardly beyond couplings 45; 46, connectors for joining the armature-windings to the commutator-bars; 47, arms projecting outwardly from clamp-rings 29, and 48 rings carried by these arms in a position to come under the outer connected portions of the armature-bars.

It will be observed that the armature is so formed as to give free circulation of air endwise through the barrel and within the commutator and within the bore of the disks and outwardly through the spaces 33, distributed along the series of disks.

The properly-insulated armature-bars while straight are passed endwise through the enlarged portions of the slots in the disks and then drifted inwardly home in the slots, as many bars being put in each slot as the chosen system of armature-winding calls for, it being remembered that the peculiarities of my machine, aside from the armature, permit of the employment of greater depth of conductors in the armature than usual. In practice I have carried the bar-conductors to a radial depth of six inches in the armature, or more than half the magnetic depth of the disks. The bars being properly placed in the armature their ends are then bent in accordance with the desired circuits and the couplings applied, the result being an exceedingly-compact system of connections lending itself to any conceivable system of drum-armature circuits. The projecting ends of the bars and also the couplings should be well wrapped with insulating-tape. Rings 48 should also be well insulated by wrapping. These rings give support to the projecting portions of the bars, Fig. 8 showing sufficient space left between the rings and the bars to provide for the presence of the insulating wrapping. Connectors 46 should be thin and flexible to permit their being readily bent and carried from any given armature-bars to the proper commutator-bar. The brushes and their holding devices may be of any ordinary or suitable construction. No provision need be made for adjusting the diameter of commutation, as there is no tendency toward sparking in my machine save such as might result from a rough commutator or bad condition of brushes.

The improvements having been set forth in conjunction with a selected exemplifying type of machine, the formal modifications requisite in applying them to other types of machines will readily suggest themselves to the skilled constructor. What has been set forth represents the best mode in which I at present contemplate applying the principles of my invention.

I claim as my invention—

1. In a dynamo-electric machine, the combination, substantially as set forth, of a coil of wire having a binding-wrapper, as of cord, and studs projecting from the faces of the coil and having feet engaging under the wrapper.

2. In a dynamo-electric machine, the combination, substantially as set forth, of a field-core provided with a dividing slot, and a coil disposed upon said core and free therefrom so as to form an air-space extending around the core and in communication with the slot therein.

3. In a dynamo-electric machine, the combination, substantially as set forth, of a field-frame, a core projecting inwardly therefrom and provided with a dividing slot and with a projection inwardly at the root of the slot, and a coil disposed upon said core and near said field-frame but free from the core and field-frame so as to leave an air-space in communication with said slot and extending between the coil and core and between the coil and field-frame.

4. In a dynamo-electric machine, the combination, substantially as set forth, of a field-frame, having inwardly-projecting field-cores, cylindrically bored at their faces, and a bushing-ring carrying coils, and having its periphery engaging the face of said cores.

5. In a dynamo-electric machine, the combination, substantially as set forth, of a field-frame having inwardly-projecting field-cores cylindrically bored at their faces, a bushing-ring carrying coils and having its periphery engaging the faces of said cores, and circumferential rib and groove connections between the bushing-ring and core-faces to retain the bushing-ring sidewise.

6. In a dynamo-electric machine, the combination, substantially as set forth, of a field-frame having inwardly-projecting field-cores cylindrically bored at their faces, a bushing-ring carrying coils and having its periphery engaging the faces of said cores, and symmetrically-disposed circumferential rib and groove connections between the bushing-ring and core-faces to retain the bushing-ring sidewise and to permit of its reversal within the field-frame.

7. In a dynamo-electric machine, the combination, substantially as set forth, of a field-frame carrying inwardly-projecting cores and field-coils, an armature concentrically mounted within the field-frame, a bushing-ring carrying coils and encircling the armature and supported by the cores of the field-frame.

8. In a dynamo-electric machine, the combination, substantially as set forth, of a field-frame provided with poles and magnetizing-coils, an armature, and a ring carrying coils and interposed between said armature and field-frame.

9. In a dynamo-electric machine, the combination, substantially as set forth, of a field-frame carrying inwardly-projecting cores and field-coils, an armature concentrically mounted within the field-frame, a bushing-ring encircling the armature and supported by the cores of the field-frame, and a circumferential series of conductors carried by the bushing-ring and disposed parallel with the axis of the armature.

10. In a dynamo-electric machine, the combination, substantially as set forth, of a field-frame carrying inwardly-projecting cores provided with field-coils, an armature mounted concentrically within the field-frame, a bushing-ring surrounding the armature and supported by the field-frame and provided with passages extending through it parallel with its axis, and conductors extending across the bushing-ring through said passages.

11. In a dynamo-electric machine, the combination, substantially as set forth, of a field-frame carrying cores and field-coils, an armature mounted concentrically within the field-frame, a bushing-ring surrounding the armature and supported by the field-frame and having passages through it parallel with its axis, and conductors disposed within said passages and joined at each side of the bushing-ring to form a circumferential series of coils carried by the bushing-ring.

12. In a dynamo-electric machine, the combination, substantially as set forth, of a field-frame carrying cores and field-coils, an armature mounted concentrically within the field-frame, a bushing-ring having a tire fitting within and held by the field-cores and provided with lugs extending across the tire and projecting inwardly to near the armature, and coils formed of conductors wound upon said lugs.

13. In a dynamo-electric machine, the combination, substantially as set forth, of a field-frame carrying cores and field-coils, an armature mounted concentrically within the field-frame, a bushing-ring comprising a transversely and circumferentially slotted tire, and slotted lugs projecting inwardly from the tire to near the armature, and coils formed by conductors wound upon said lugs.

14. In a dynamo-electric machine, the combination, substantially as set forth, with a field-frame and armature, of a tire having pairs of transverse slots and having circumferential slots between the pairs of transverse slots, commutation-lugs projecting from the tire between each pair of transverse slots, additional lugs projecting from the tire between the commutation-lugs and divided by inward prolongations of said circumferential slots, and coils formed by conductors wound on said lugs.

15. In a dynamo-electric machine, the combination, substantially as set forth, of a field-frame, cores projecting therefrom and having dividing slots, coils on said cores, a tire supported by said cores and having circumferential slots registering with the slots in said cores, lugs projecting inwardly from the tire, and coils formed by conductors wound upon said lugs.

16. In a dynamo-electric machine, the combination with a field-frame and armature of a ring interposed between said field-frame and armature and carrying compensating-coils.

17. In a dynamo-electric machine, the combination, substantially as set forth, with a field-frame and armature, of a slotted tire, lugs projecting inwardly from the tire and having less width than the tire, additional lugs projecting inwardly from the tire between the first-mentioned lugs and having a greater width than the first-mentioned lugs, bridges extending across the ends of the first-mentioned lugs and connecting the lugs immediately at each side of the first-mentioned lugs, and coils formed by conductors wound upon said lugs.

18. In a dynamo-electric machine, the combination, substantially as set forth, with a field-frame and armature, of a tire held by the field-frame, lugs projecting inwardly from the tire and provided with inner feet cylindrically bored to form a chamber for the armature, and coils wound upon said lugs between said tire and feet.

19. In a dynamo-electric machine, the combination, substantially as set forth, of a field-frame carrying cores and field-coils, an armature mounted concentrically within said field-frame and having a diameter less than the bore of the series of field-cores a circumferential series of coils disposed around the armature between the armature and the field-cores, and a metallic support for said last-mentioned coils and connected separably with the field-frame.

20. In a dynamo-electric machine, the combination, substantially as set forth, of a field-frame carrying inwardly-projecting cores, field-coils on said cores, an armature mounted concentrically within the field-frame and having a diameter less than the bore of the series of field-cores, coils disposed in circumferential series around the armature between the armature and the field-cores, the last-mentioned coils having longitudinal elements parallel with the axis of the armature, and the axis of each of said last-mentioned coils coming midway between the axis of the pair of field-cores, and a support engaging said field-cores and said last-mentioned coils.

21. In a dynamo-electric machine, the combination, substantially as set forth, of a field-frame carrying cores and field-coils, an armature mounted concentrically within the field-frame and having a diameter less than the bore of said field-cores, fixed conductors parallel with the axis of the armature and disposed in circumferential series around the armature between the armature and the field-cores, and connections to convey current through said conductors in direction opposite to that followed by the current flowing through contiguous conductors in the armature.

22. In a dynamo-electric machine, the combination, substantially as set forth, of a field-frame carrying cores and field-coils, an armature mounted concentrically within the field-frame and having a diameter less than the bore of the series of field-cores, fixed conductors parallel with the axis of the armature and arranged in circumferential series between the armature and the field-cores, and connections between said fixed conductors and the armature to convey the current traversing the armature-conductors through said fixed conductors in such direction that the current flowing in each of said fixed conductors will magnetically oppose that flowing in the contiguous armature-conductor.

23. In a dynamo-electric machine, the combination, substantially as set forth, with a field-frame carrying cores and field-coils, and an armature mounted within the field-frame, of fixed conductors parallel with the axis of the armature and disposed in circumferential series around the armature, connections conveying current through said fixed conductors in direction to magnetically oppose the currents flowing through contiguous armature-conductors, commutation-lugs disposed between the field-cores and magnetically energized by the currents flowing in said fixed conductors.

24. In a dynamo-electric machine, the combination, substantially as set forth, of a field-frame carrying cores and field-coils, an armature mounted concentrically within said field-frame and having a diameter less than the bore of the field-cores, a commutation-lug disposed between each pair of field-cores and presenting a pole to the armature, additional similar lugs disposed between said commutation-lug, and coils formed by winding a conductor first upon a commutation-lug and then outside the pair of additional lugs at each side of the commutation-lug.

25. In a dynamo-electric machine, the combination, substantially as set forth, of a field-frame carrying cores and field-coils, an armature mounted concentrically within the field-frame and having a diameter less than the bore of the series of field-cores, and a series of fixed coils disposed around the armature between the armature and the field-cores, the coils of said series alternating in direction of winding.

26. In a dynamo-electric machine, the combination, substantially as set forth, of a longitudinally-grooved armature-barrel, ribs of non-magnetic metal disposed in said grooves, a series of disks with their bores engaged by said ribs, and clamps secured to the armature-barrel and engaging the end of the series of disks.

27. In a dynamo-electric machine, the combination, substantially as set forth, of an armature-barrel, a series of disks thereon and provided with a circumferential series of radial slots, each slot being widened at its outer portion, and clamps carried by the armature-barrel and engaging the ends of the series of disks.

28. In a dynamo-electric machine, the combination, substantially as set forth, of longitudinally-slotted armature-bars disposed within said slots and projecting endwise from the body of the armature, bends formed upon the projecting ends of said bars to bring the ends of a pair of bars toward each other, and flat coupling-strips united to and connecting the ends of such pair of bars.

29. In a dynamo-electric machine, the combination, substantially as set forth, of a longitudinally-slotted armature, bars disposed in said slots and projecting endwise from the body of the armature, bends formed upon the projecting ends of said bars to bring the ends of a pair of bars toward each other, connections between the ends of such pair of bars, and rings concentrically carried by the armature within the projecting connected ends of the bars and forming a support for such projecting ends.

30. In a dynamo-electric machine, the combination, substantially as set forth, of an armature-hub, arms projecting endwise therefrom, a hollow nose carried by said arms, and a commutator-hub having its bore fitting upon said nose.

31. In a dynamo-electric machine, the combination, substantially as set forth, with balancing-coils for neutralizing armature reaction, of a bushing-ring carrying said balancing-coils and supported by the field-frame.

32. In a dynamo-electric machine, the combination, substantially as set forth, with balancing-coils for neutralizing armature reaction and disposed within the main field of magnetic force impressed upon the armature, of commutation-lugs passing through the centers of said balancing-coils and energized solely by said coils.

33. In a dynamo-electric machine, the combination, substantially as set forth, with balancing-coils for neutralizing armature reaction, of a bushing-ring carrying said balancing-coils, and commutation-lugs passing through the centers of said balancing-coils and energized thereby.

34. In a dynamo-electric machine, the combination, substantially as set forth, with balancing-coils for neutralizing armature reaction, of a bushing-ring formed of magnetic material and carrying said balancing-coils, and commutation-lugs passing through the centers of said balancing-coils and energized thereby.

35. In a dynamo-electric machine, the combination, substantially as set forth, with an armature and a field-frame and cores, of a ring carrying balancing-coils and commutation-lugs contiguous to the armature.

MILTON E. THOMPSON.

Witnesses:
JAMES W. SEE,
C. H. SCHELL.